(12) United States Patent
Tillitski

(10) Patent No.: US 7,984,542 B1
(45) Date of Patent: Jul. 26, 2011

(54) MULTI-STRAND CABLE TERMINATION MEANS

(76) Inventor: Stephan W. Tillitski, Athens, GA (US)

( * ) Notice: Subject to any disclaimer, the term of this patent is extended or adjusted under 35 U.S.C. 154(b) by 1153 days.

(21) Appl. No.: 11/710,642

(22) Filed: Feb. 26, 2007

(51) Int. Cl.
*B23P 11/00* (2006.01)
*H01R 13/04* (2006.01)

(52) U.S. Cl. ........................ 29/525.02; 29/729

(58) Field of Classification Search ............... 29/525.02, 29/428, 444, 451, 461, 34 R, 566.4, 33 F, 29/33 M, 719, 729, 744, 747, 758, 761, 255, 29/261, 263, 270, 281.1
See application file for complete search history.

(56) References Cited

U.S. PATENT DOCUMENTS

| | | | |
|---|---|---|---|
| 985,915 A | 3/1911 | Marchand, Jr. | |
| 1,723,728 A | 8/1929 | Fox | |
| 1,758,218 A | 5/1930 | Carlson | |
| 1,758,312 A | 5/1930 | De Right | |
| 2,470,891 A * | 5/1949 | Hammers | 29/235 |
| 3,254,383 A | 6/1966 | Ehmann | |
| 3,475,795 A | 11/1969 | Youngblood | |
| 3,600,765 A | 8/1971 | Rovinsky et al. | |
| 3,676,899 A | 7/1972 | Ehlert | |
| 3,975,799 A | 8/1976 | Kerr | |
| 4,055,365 A | 10/1977 | Kucherry | |
| 4,261,643 A | 4/1981 | Stiles et al. | |
| 4,279,531 A | 7/1981 | McKenzie | |
| 4,507,008 A | 3/1985 | Adl et al. | |
| 5,231,752 A | 8/1993 | Hereford | |
| 5,802,788 A | 9/1998 | Ozawa et al. | |
| 6,594,888 B2 * | 7/2003 | Chang | 29/751 |
| 6,684,585 B2 | 2/2004 | Campbell | |
| 6,718,707 B2 | 4/2004 | Marshall | |
| 6,748,708 B1 | 6/2004 | Fuzier et al. | |

* cited by examiner

*Primary Examiner* — John C Hong
(74) *Attorney, Agent, or Firm* — Rodgers & Rodgers

(57) ABSTRACT

An insertion tool for manipulating a cable termination device having an auxiliary handle section pivoted to a base handle section, the inner and outer bodies of a cable termination device nested together with multiple cable strands positioned between the two bodies, and the inner strand of the cable extending through an aperture in the inner body and being adapted to be bend 90 degrees by manipulation of the handle sections.

7 Claims, 3 Drawing Sheets

MULTI-STRAND CABLE TERMINATION MEANS

BACKGROUND OF THE INVENTION

In the process of securing multi-strand steel cables to trees, power poles and the like, it is often necessary to secure one pole to another or to stabilize a tree in order to prevent it from falling over. This is accomplished generally by attaching one end of a cable to the tree or pole to be supported and securing the other end of the cable to some other object. The mechanics of attaching the cable to a tree or pole present technical difficulties in the field. Multi-strand cables are typically attached to the tree or utility pole by attaching a J-hook or lag bolt that is screwed into the tree or pole. A thimble and a preformed wrap are then attached to the J-hook. Also, a steel cable can be bent around the J-hook and the thimble secured with bulldog clips. As an alternative, the steel cable is attached using eyebolts installed through the tree or pole and secured in like manner. These known attachment methods require multiple parts to secure the steel cable in place and are difficult to use in close quarters such as when the trees are close together and when operating well above ground level.

BRIEF SUMMARY OF THE INVENTION

A multi-strand steel cable with multiple strands disposed between inner and outer bodies of the cable termination device with the inner strand of the steel cable extending through an aperture formed in the inner body. The arrangement further includes an insertion tool having a magnetic end for attachment to the inner body with the insertion tool comprising a base handle section and an auxiliary handle section with a slot formed in the distal end of the auxiliary handle section for the purpose of bending the inner strand through an angle of 90 degrees.

DETAILED DESCRIPTION OF THE INVENTION

Figure 1:
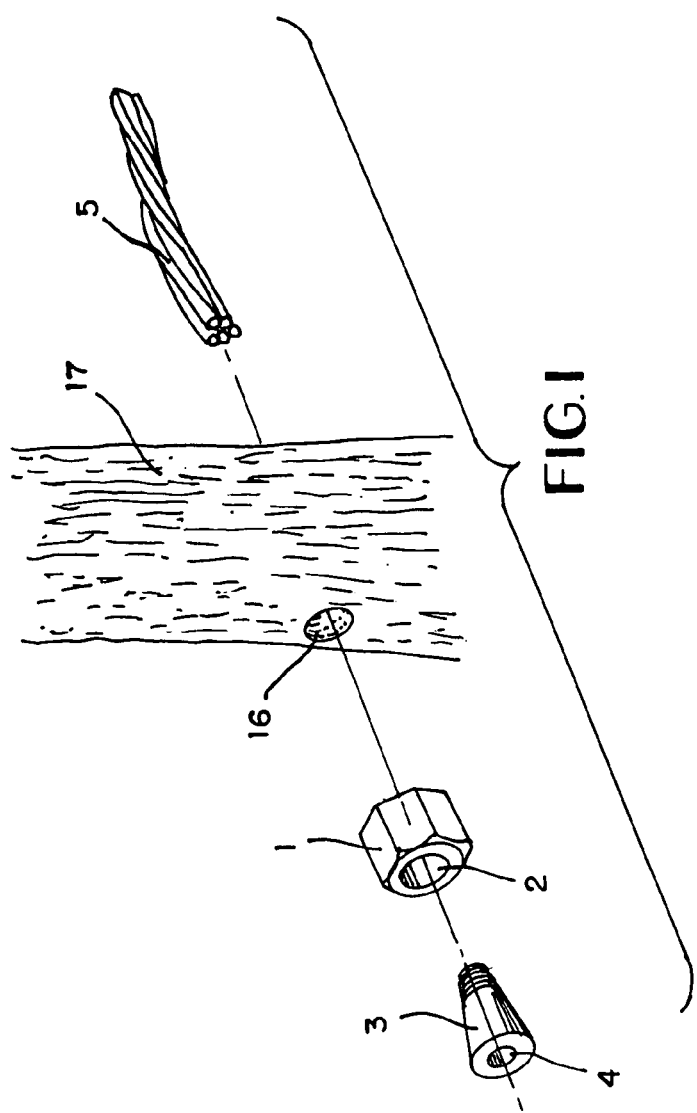
FIG. 1 is a partially exploded perspective view showing operation of the cable termination means according to this invention.

With reference to the drawings and with particular reference to FIG. 1, cable termination means for use especially in connection with multi-strand steel cable is shown and includes outer body 1 which further includes tapered aperture 2 extending therethrough. Inner body 3 includes a tapered outer wall which corresponds to tapered aperture 2 in outer body 1 such that inner body 3 is adapted to nest within aperture 2 formed in outer body 1. In addition, aperture 4 extends entirely through the inner portion of inner body 3.

Figure 5:
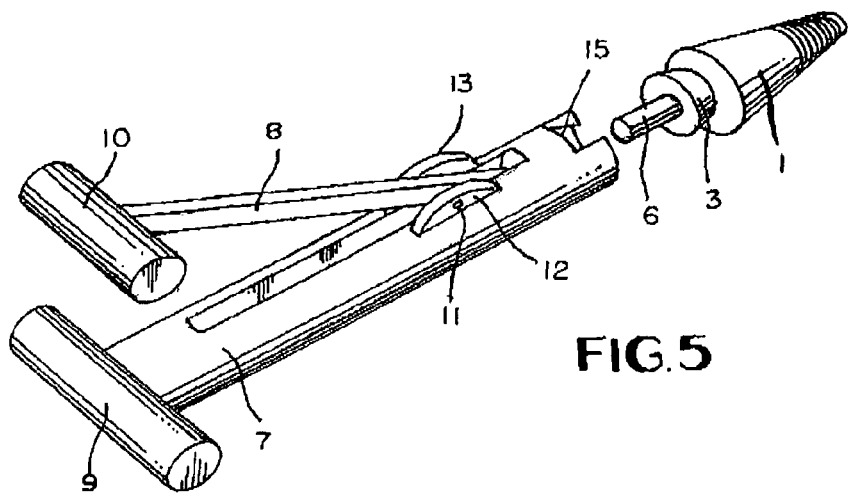
FIG. 5 is a perspective view of the insertion tool according to this invention.
Figure 6:
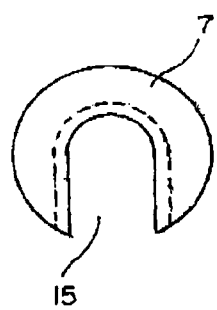
FIG. 6 is a view of the operational and of the insertion tool.
Figure 8:
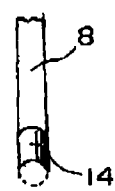
FIG. 8 is a side elevational view taken along the line 8-8 in FIG. 7.
Figure 7:
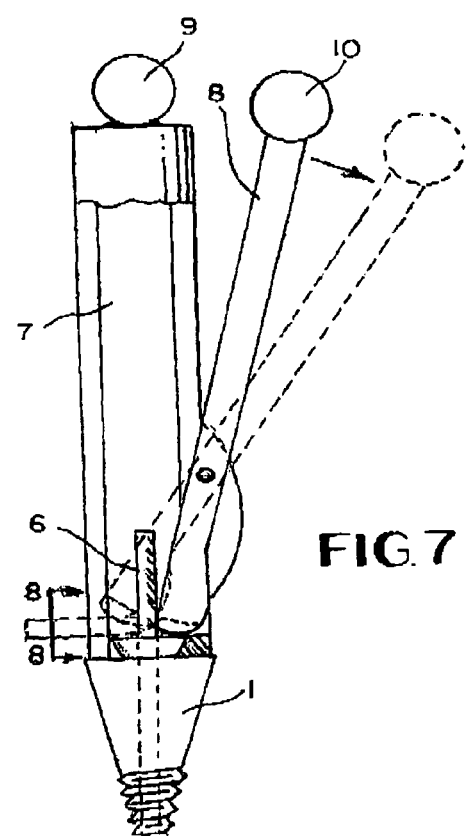
FIG. 7 is an elevational view showing operation of the insertion tool.

Also, although outer body 1 is shown in FIGS. 1-4 as being hexagonal, other shapes are equally suitable, for instance as shown in FIGS. 5 and 7.

Figure 2:
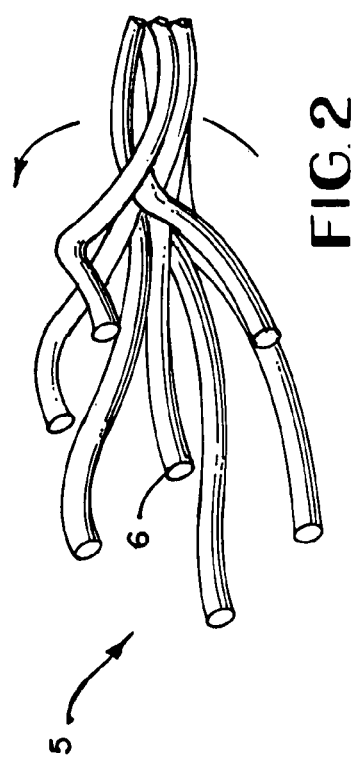
FIG. 2 is a perspective view of the end of a multi-strand cable.
Figure 3:
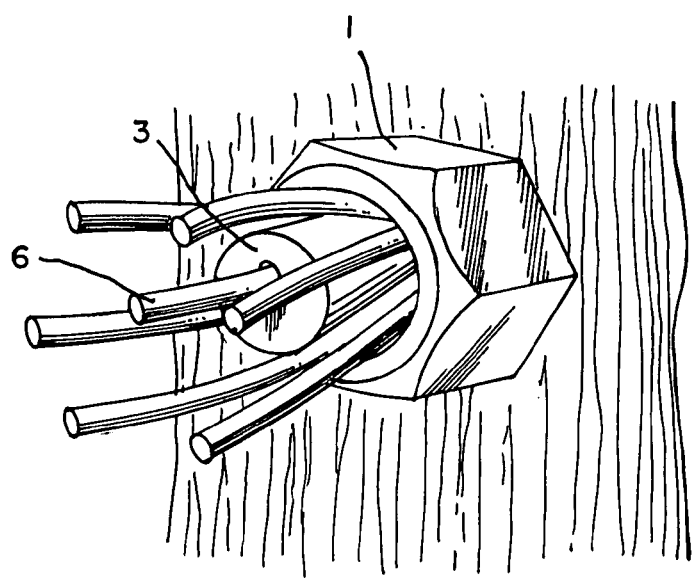
FIGS. 3 and 4 are enlarged perspective views showing the multi-strand cable termination means.
Figure 4:
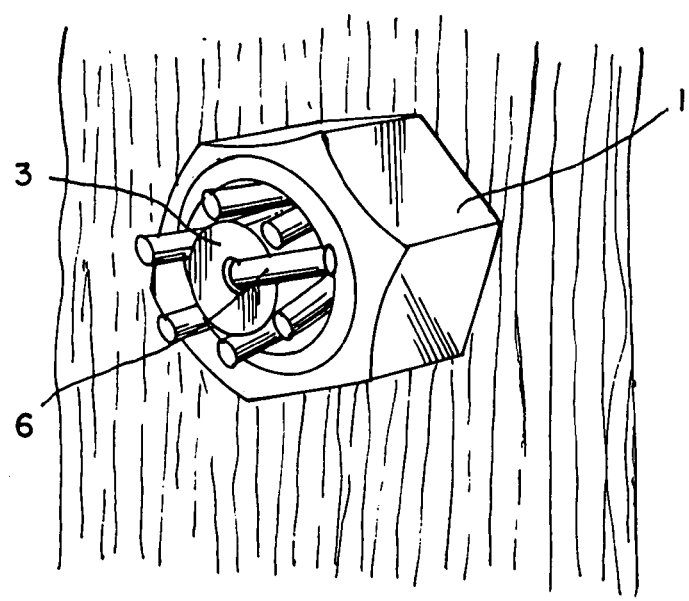

In FIG. 2, a multi-strand steel cable is generally indicated by the numeral 5 and includes inner strand 6.

The insertion tool, according to this invention, is depicted in FIG. 5 and comprises base handle section 7 and auxiliary handle section 8 with hand gripping bars 9 and 10 attached, respectively, to the ends thereof. Auxiliary handle section 8 is pivoted on pin 11 which extends through bosses 12 and 13 which are upstanding from base handle section 7. Also, the end of auxiliary handle section 8 opposite hand gripping bar 10 includes slot 14 formed therein. In addition, the end of base handle section 7, opposite hand gripping bar 9, includes slot 15 and, according to this invention, the end of base handle section 7 surrounding slot 15 is magnetized.

This invention may be used to terminate steel cable in various applications and one application is shown in FIGS. 1-4 wherein bore 16 is drilled in tree 17, as shown in FIG. 1. In actual practice, steel cable 5 is inserted through bore 16 and outer body 1 is slipped onto steel cable 5. Then the end of steel cable 5 is unraveled leaving inner stand 6 in the middle with the remaining strands spaced generally around the periphery of aperture 2. Inner body 3 is then positioned on the end of the insertion tool and inner body 3 is pushed into aperture 2 of outer body 1 such that inner strand 6 extends through aperture 4 with the remaining strands positioned between the inner surface of aperture 2 and outer surface of inner body 3. Since the end of insertion tool is magnetized, inner body 2 is prevented from being inadvertently dropped, and by this means, lost time is virtually eliminated which is especially important when working well above ground level.

With inner body 3 disposed in corresponding aperture 2 of outer body 1 and with inner body 3 still secured to the magnetized end of the insertion tool, inner strand 6 is automatically positioned in slot 14 of auxiliary handle section 8. Following this, the operator grips hand gripping bars 9 and 10 and pulls them apart which causes auxiliary handle section 8 to pivot on pin 11. As this occurs and as best shown in FIG. 7, this operation causes inner strand 6 disposed in slot 14 to swing through slot 15 of base handle section 7 and bend 90 degrees. Upon the application of tensile force to the cable, the cable strands pull inner body 3 into outer body 1 thereby securing the cable in position.

Therefore, when working in a environment such as above the ground in a tree, this invention provides a reliable and efficient means to terminate a steel cable even under difficult circumstances. This is achieved by temporarily attaching inner body 3 to the insertion tool, because it is magnetized, and with a single motion of the insertion tool securing the cable termination device such that withdrawal of the cable from the device is virtually impossible.

The invention claimed is:

1. A cable termination arrangement comprising an insertion tool having a base handle section, an auxiliary handle section pivotally connected to said base handle section at a pivot, said auxiliary handle section pivoting through an arc, one end of said base handle section including a slot formed therein, a portion of said base handle section adjacent said slot being magnetized, said auxiliary handle section including an end, a second slot formed on said end of said auxiliary handle section adjacent said pivot, said slot being in close proximity to said second slot, and said arc of said auxiliary handle section being disposed at least partially within said slot.

2. An arrangement according to claim 1 wherein an inner body is attracted to said magnetized portion, an aperture is formed in said inner body, and a multi-strand cable includes an inner strand extending through said aperture in said inner body.

3. An arrangement according to claim 2 wherein said inner strand is disposed in said slot formed on the end of said auxiliary handle section.

4. An arrangement according to claim 3 wherein said inner body is disposed in an aperture formed in an outer body.

5. An arrangement according to claim 4 wherein the remaining strands of said multi-strand cable are disposed between said inner body and said outer body.

6. A method of terminating a multi-strand cable, an inner body disposed in an aperture formed in an outer body, an aperture formed in said inner body, an insertion tool having an auxiliary handle section pivoted to a base handle section at a pivot, a slot formed in the end of said auxiliary handle section adjacent said pivot, said multi-strand cable comprising a middle strand, said middle strand having an end, the middle strand of said cable extending through said aperture formed in said inner body with the end thereof disposed in said slot, the method comprising the steps of separating said handle sections and bending said end of said middle strand through an angle of 90 degrees.

7. A method according to claim 6 wherein a second slot is formed in said base handle adjacent said pivot, the end of said base handle section adjacent said second slot formed in said base handle being magnetized, the method further comprising the step of swinging said end through said second slot.

* * * * *